US006643509B1

United States Patent
Crow

(10) Patent No.: US 6,643,509 B1
(45) Date of Patent: Nov. 4, 2003

(54) CIVIL AVIATION COMMUNICATION SYSTEM

(76) Inventor: Robert Palmer Crow, 4725 Bywood Ct., Colorado Springs, CO (US) 80906

( * ) Notice: Subject to any disclaimer, the term of this patent is extended or adjusted under 35 U.S.C. 154(b) by 0 days.

(21) Appl. No.: 09/522,787

(22) Filed: Mar. 10, 2000

Related U.S. Application Data

(60) Provisional application No. 60/124,908, filed on Mar. 17, 1999.

(51) Int. Cl.$^7$ ................................................ H04Q 7/20
(52) U.S. Cl. ...................................... 455/431; 455/427
(58) Field of Search ................................ 455/431, 430, 455/12.1–13.1, 427, 422, 446, 447, 450, 454; 340/352, 947, 948, 979; 370/316, 325, 326; 375/130; 701/120, 215, 300; 342/357, 463, 456, 454, 354, 33, 37, 352; 244/183

(56) References Cited

U.S. PATENT DOCUMENTS

| | | | | |
|---|---|---|---|---|
| 3,728,728 A | * | 4/1973 | Vogel et al. ................ 343/17.7 |
| 4,454,510 A | | 6/1984 | Crow ............................ 343/5 |
| 4,688,046 A | * | 8/1987 | Schwab ....................... 342/456 |
| 5,099,245 A | * | 3/1992 | Sagey ......................... 342/357 |
| 5,311,194 A | * | 5/1994 | Brown ......................... 342/357 |
| 5,621,415 A | * | 4/1997 | Tuck et al. .................. 342/354 |
| 5,627,546 A | | 5/1997 | Crow ........................... 342/352 |
| 5,702,070 A | * | 12/1997 | Waid ........................... 244/183 |
| 5,786,773 A | * | 7/1998 | Murphy ........................ 340/947 |
| 5,798,726 A | * | 8/1998 | Schuchman et al. ......... 342/37 |
| 5,929,783 A | * | 7/1999 | King et al. ............. 340/870.05 |
| 5,995,043 A | * | 11/1999 | Murphy .................. 342/357.03 |
| 6,044,323 A | * | 3/2000 | Yee et al. .................... 701/120 |
| 6,201,797 B1 | * | 3/2001 | Leuca et al. ................. 370/316 |

\* cited by examiner

Primary Examiner—Edward F. Urban
Assistant Examiner—C. Chow
(74) Attorney, Agent, or Firm—Law Office of Dale B. Halling, LLC

(57) ABSTRACT

A civil aviation communication system has a satellite subsystem including a constellation of satellites. A ground subsystem communicates with the satellite subsystem. The ground subsystem includes a number of networked ground stations at selected locations. An airborne communication subsystem is included in the aircraft. The airborne subsystem transmits to the satellite subsystem in a first frequency band. The airborne subsystem receives transmissions from the satellite subsystem in a second frequency band. The airborne subsystem communicates with a ground based system in a third frequency band. The third frequency band is between the first frequency band and the second frequency band.

16 Claims, 4 Drawing Sheets

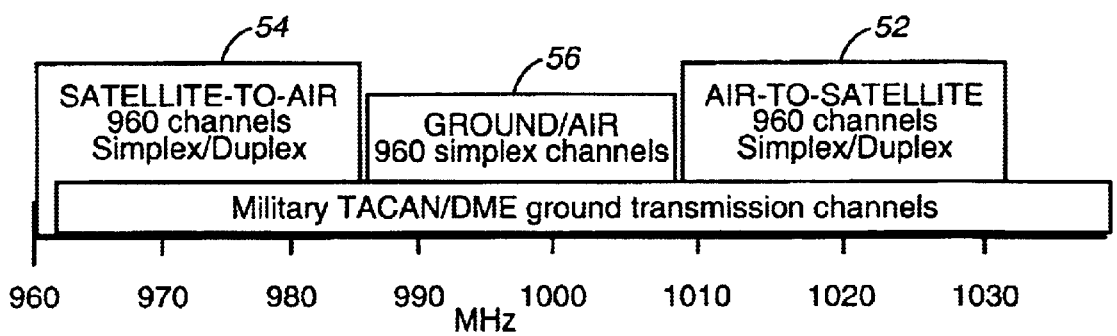

FIG. 2

| Aircraft/Satellite Links Power Budget | |
|---|---|
| Aircraft-to-Satellite Link | |
| A/C transmitter average power, 20 watts | +43.0 dBm |
| A/C antenna gain (4), pattern loss (3), cable loss (1) | 0.0 dB |
| Propagation loss, 23,000 miles at 1000 MHz | -184.2 dB |
| Satellite antenna gain, with 4.5° beams | +31.3 dB |
| Minimum receiver input: | -109.9 dBm |
| Satellite receiver KTB, 130°K equivalent, 25 KHz BW | -133.5 dBm |
| Minimum (25 KHz BW) S/N | +23.6 dB |
| | |
| Satellite-to-Aircraft Link | |
| Satellite transmitter average power per channel, 40 watts | +46.0 dBm |
| Propagation loss, 23,000 miles at 1000 MHz | -184.2 dB |
| Satellite transmitter antenna gain, with 8.6° beams | +25.6 dB |
| A/C antenna gain (4), pattern loss (3), cable loss (1) | 0.0 dB |
| Minimum receiver input: | -112.6 dBm |
| A/C receiver KTB, 200°K equivalent, 25 KHz BW | -131.6 dBm |
| Minimum (25 KHz BW) S/N | +19.0 dB |

FIG. 3

CIVIL AVIATION COMMUNICATION SYSTEM

RELATED INVENTIONS

This application claims the benefit of provisional application Ser. No. 60/124,908 filed Mar. 17, 1999.

The present invention is related to U.S. Pat. No. 4,454, 510, issued Jul. 12, 1984 and U.S. Pat. No. 5,627,546, issued May 6, 1997 and having the same inventor as the present invention. U.S. Pat. Nos. 4,454,510 and 5,6127,546 are hereby incorporated by reference.

FIELD OF THE INVENTION

The present invention relates generally to the field of aircraft communication systems.

BACKGROUND OF THE INVENTION

The present civil aviation system is serviced by a patchwork of systems. These systems include VOR (VHF Omnidirectional Range system), DME (Distance Measuring Equipment), ILS (Instrument Landing System) and ATCRBS (Aircraft Traffic Control transponder). There is presently a proposal to replace some of these systems with a GPS (Global Positioning System) based system. Unfortunately, the proposed GPS based system does not provide all the functions required by a civil aviation system. For instance, the proposed GPS system does not provide voice and data communication capabilities. The existing VHF channels only cover continental regions, are overloaded and utilize old and limited analog technology. In addition, they require expensive landline inter-ties.

Thus there exists a need for a civil aviation communication system that provides coverage over oceanic areas as well as continental areas and is integrated with the other civil aviation functions.

BRIEF DESCRIPTION OF THE DRAWINGS

FIG. 2 is a communication frequency usage chart in accordance with one embodiment of the invention;

FIG. 3 is an aircraft/satellite link power budget in accordance with one embodiment of the invention;

DETAILED DESCRIPTION OF THE DRAWINGS

The present invention is related to a civil aviation communication system as a subsystem of the Integrated Global Surveillance And Guidance System (IGSAGS), in part described in the above referenced patents. A civil aviation communication system has a satellite subsystem including a constellation of satellites. A ground subsystem communicates with the satellite subsystem. The ground based subsystem includes a number of networked ground stations at selected locations. An airborne subsystem is included in the aircraft. The airborne subsystem transmits to the satellite subsystem in a first frequency band. The airborne subsystem receives transmissions from the satellite subsystem in a second frequency band. The airborne subsystem also communicates with a ground based system in a third frequency band. The third frequency band is between the first frequency band and the second frequency band. This communication system provides both continental and oceanic coverage and minimizes landline inter-ties.

Figure 1:
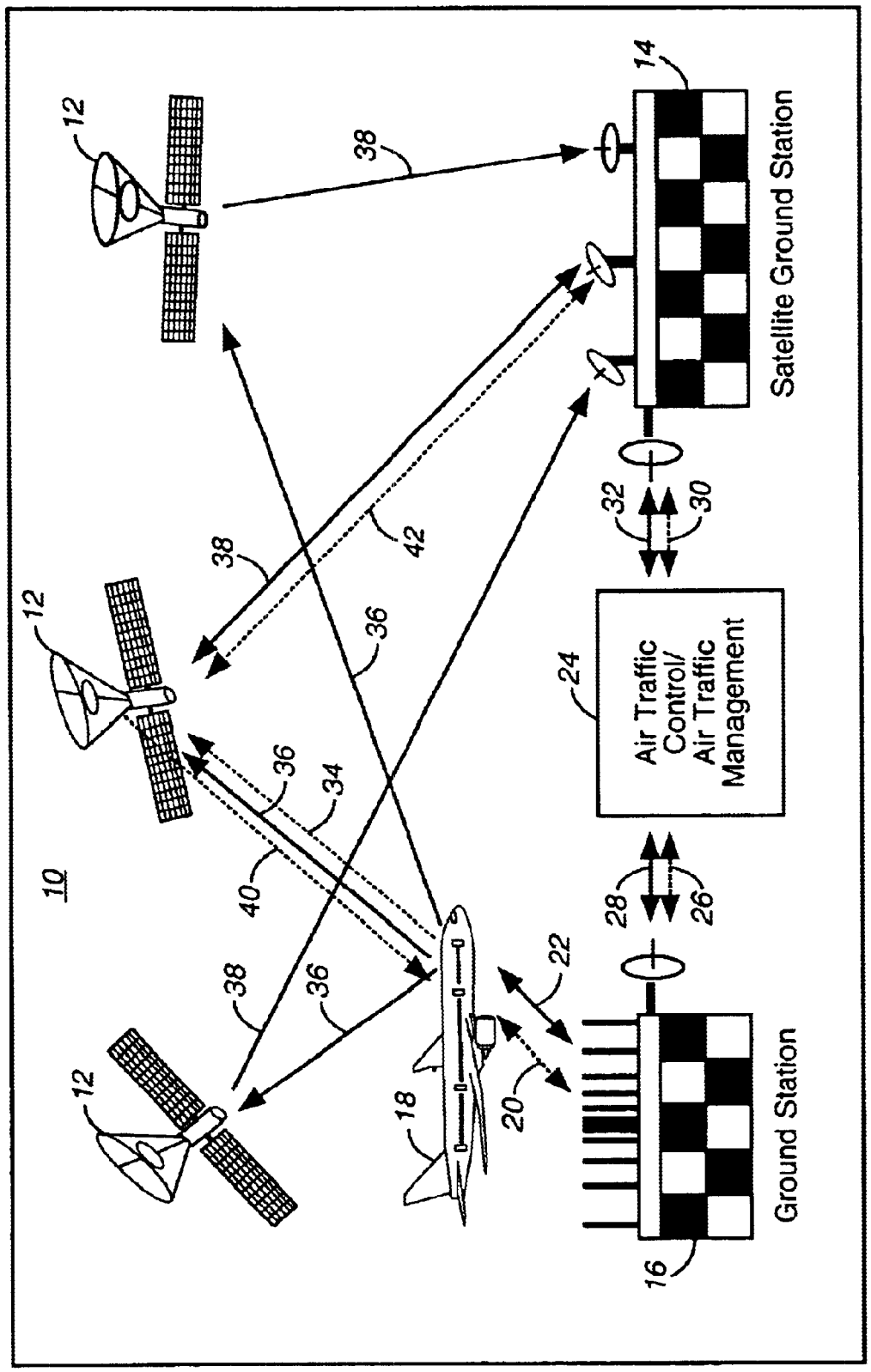
FIG. 1 is a schematic diagram of a civil aviation communication system in accordance with one embodiment of the invention.

FIG. 1 is a schematic diagram of a civil aviation communication system 10 in accordance with one embodiment of the invention. The figure shows ground and satellite subsystems of the IGSAGS with inter-communication links for its surveillance and guidance functions. The voice and data communication links to and from the aircraft are shown in dotted lines. A constellation of satellites 12 form a satellite subsystem. A ground subsystem 14 communicates with the satellites 12. The ground subsystem 14 has a plurality of networked ground stations (one shown) 14 at a plurality of persecuted locations. A ground based system 16 communicates with an aircraft 18 for relatively short range continental and terminal areas. The ground based system 16 has a communication link 20 with the aircraft. In addition, a guidance/surveillance link 22 determines a position of the aircraft 18. The ground based system 16 is connected to an air traffic control and management facility 24 by a communication link (voice and data) 26 and by a surveillance/guidance link 28. The ground subsystem (satellite ground station) 14 is connected the air traffic control and management facility 24 by a communication link (voice and data) 30 and by a surveillance/guidance link 32.

The aircraft has an airborne subsystem that transmits and receives voice and data information over communication links 40 & 34 (via separate satellite and aircraft antenna) to one of the satellites. The satellite 12 repeats the voice and data information to or from the satellite ground station over a communication link 42.

FIG. 2 is a communication frequency usage chart 50 in accordance with one embodiment of the invention. The chart 50 shows a first frequency band 52 in which the airborne subsystem transmits to the satellite. The first frequency band contains 960 channels with 25 KHz spacing. The first frequency band 52 extends from about 1008 MHz to 1032 MHz. The satellite transmits to the aircraft in a second frequency band 54. The second frequency band also contains 960 channels of 25 KHz per channel. The second frequency band 54 extends from about 960 MHz to 984 MHz. A third frequency band 56 is in between the first frequency band 52 and the second frequency band 54. This provides isolation between the receive and transmit paths on the satellite. The third frequency band 56 covers the aircraft to ground and ground to aircraft communication. This is used when the aircraft is in short range continental and terminal areas. These ground/aircraft channels are simplex channels. The satellite to ground and ground to satellite links are in the 5.0 GHz area and are not shown on the usage chart. Note that the present frequency usage overlays the present military TACAN/DME ground transmission channels. This will not cause appreciable interference in most instances before retirement of the TACAN/DME because of the relative bandwidth, locations of facilities, etc.

FIG. 3 is an aircraft/satellite link power budget in accordance with one embodiment of the invention. The satellite to ground links utilize beamed transmissions and therefore more than adequate signal-to-noise ratios are obtainable. However, the aircraft utilizes an omni-directional antenna with relatively low gain. FIG. 3 shows the viability of the aircraft/satellite links. The aircraft and satellite transmitter peak power levels have been demonstrated with solid-state production units. The satellite and aircraft receiver frontends are assumed to have thermo-electric cooling. The satellite transmitter is assumed to be broadband with a number of channels transmitting simultaneously.

Figure 4:
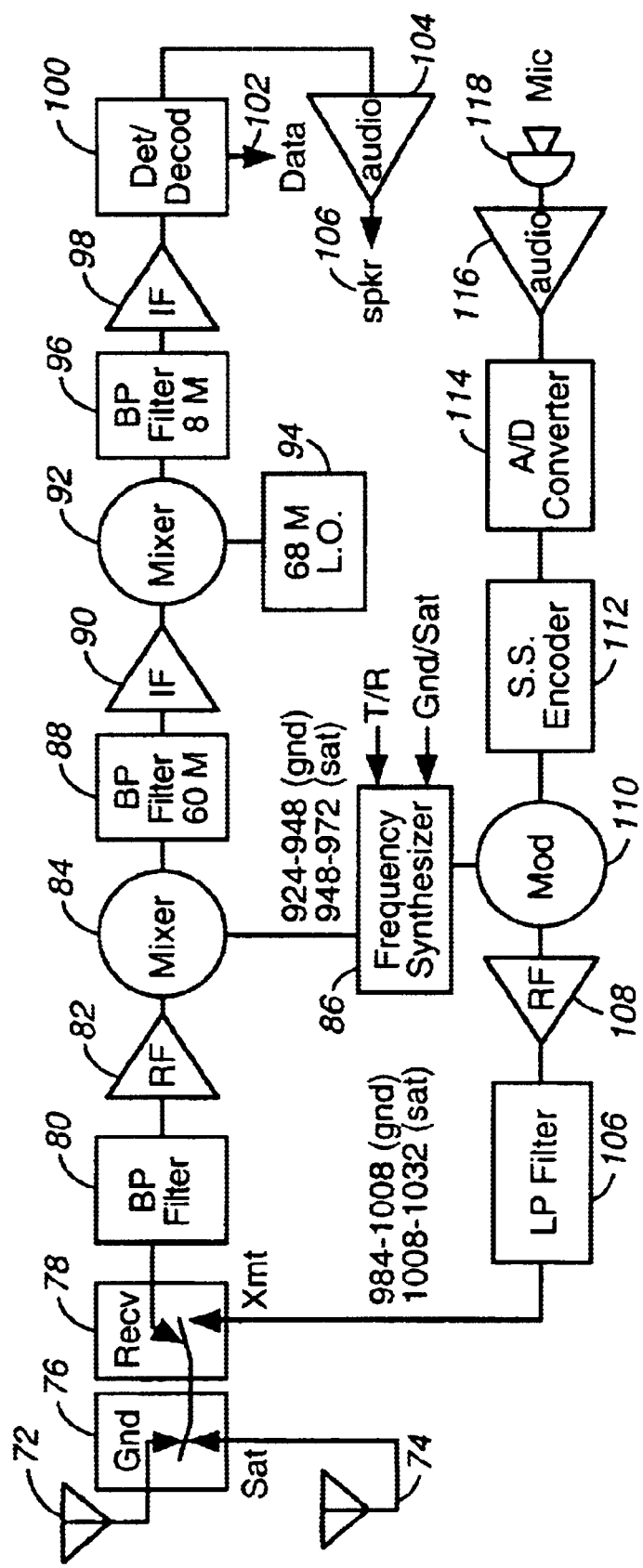
FIG. 4 is a block diagram of an aircraft communication system in accordance with one embodiment of the invention.

FIG. 4 is a block diagram of an aircraft communication system 70 in accordance with one embodiment of the invention. The aircraft communication system 70 has a ground antenna 72 and a satellite antenna 74 connected to a switch 76. A second switch 78 connects to the receiver or to the transmitter. A bandpass filter 80 is connected to the receiver path. An RF amplifier 82 is connected to the bandpass filter 80. A mixer 84 is connected to the output of the RF amplifier 82. A frequency synthesizer 86 acts as the local oscillator. The output of the mixer 84 is connected to a second bandpass filter 88. An intermediate frequency (IF) amplifier 90 is connected to the second bandpass filter 88. An IF mixer 92 is connected to the IF amplifier 90. An IF local oscillator 94 is connected to the IF mixer 92. A baseband bandpass filter 96 is connected to the IF mixer 92. An amplifier 98 is connected to the baseband bandpass filter 96. A detector and decoder 100 is connected to the amplifier 98. One output of the detector and decoder 100 is a data output 102. An audio output of 104 is connected to a speaker 106.

A low pass filter 106 is connected to the transmit path. An RF amplifier 108 is connected to the low pass filter 106. A modulator 110 is connected to the RF amplifier 108. A spread spectrum encoder 112 is connected to the modulator 110. An analog to digital converter 114 is connected to the spread spectrum encoder 112. A microphone 118 and an audio amplifier 116 are connected to the analog to digital converter 114. In one embodiment, a data input is connected to the spread spectrum encoder 112.

Figure 5:
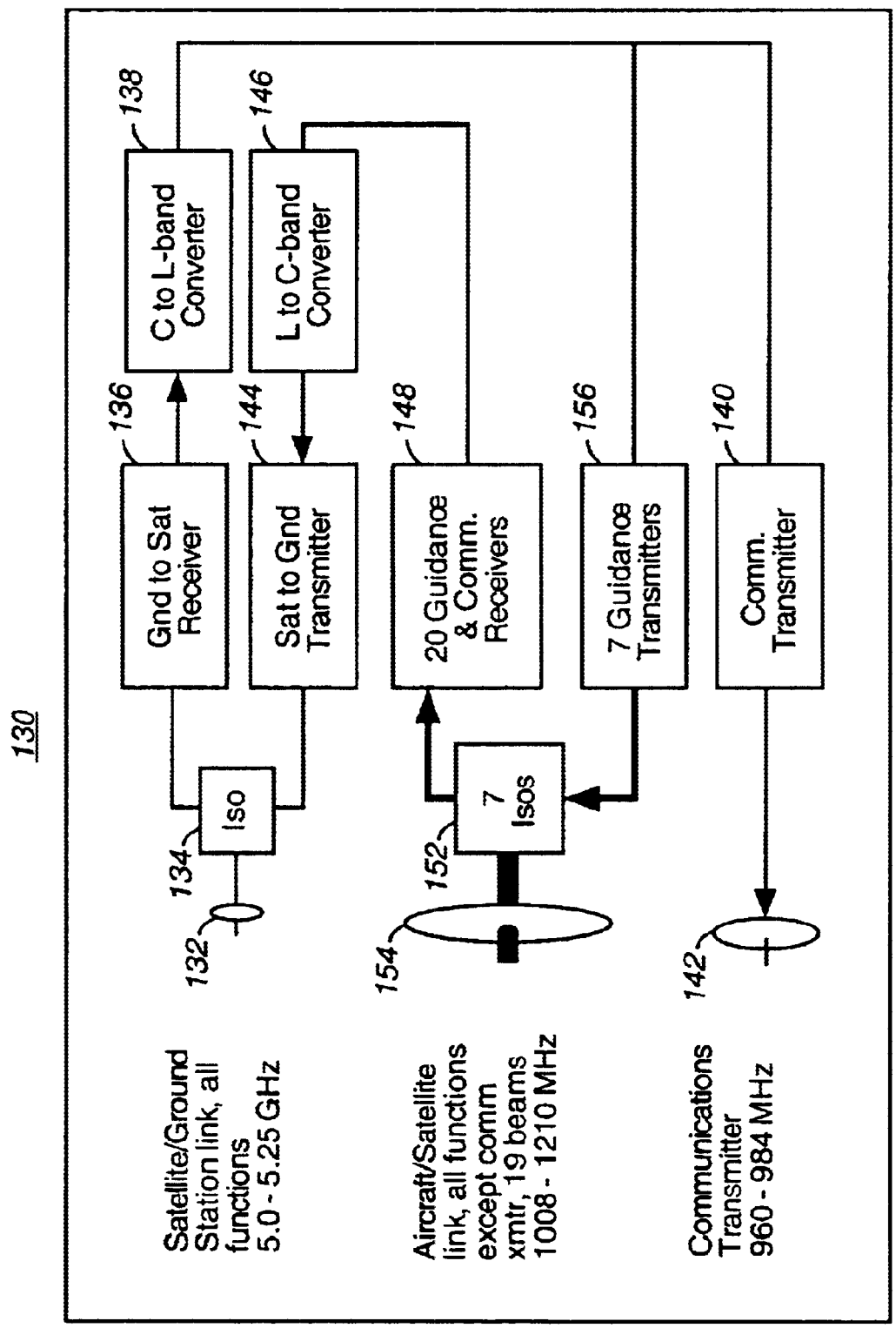
FIG. 5 is a block diagram of a satellite communication system in accordance with one embodiment of the invention.

FIG. 5 is a block diagram of a satellite communication and guidance/surveillance system 130 in accordance with one embodiment of the invention. The satellite subsystem 130 has three antennas. A first antenna 132 receives and transmits signals with a ground subsystem in the 5.0 to 5.25 GHz range (C-band). An isolator 134 separates the transmit and receive paths. A ground to satellite receiver 136 is connected to the isolator 134. A frequency translation (converter, C-band to L-band) 138 is connected to the receiver 136. A communication transmitter (broadband transmitter) 140 is connected to the frequency converter 138. A communication antenna 142 transmits to an aircraft. The satellite communication system 130 just acts as a repeater between the ground and the aircraft. A satellite to ground transmitter 144 is connected to the isolator 134. A second frequency converter 146 is connected to the transmitter 144. A communication receiver (broadband receiver) 148 is connected to the second frequency converter 146. The communication receiver is connected to a second antenna 154 through one of 19 beams and through possibly one of the plurality of isolators 152. In one embodiment, the satellite has a plurality of guidance receivers in the same path as the communication receiver 148. A plurality of guidance transmitters 156 each to a different beam are connected to the isolator 152.

Thus there has been described a civil aviation communication system that provides coverage over both continental and oceanic areas and is integrated with the other civil aviation functions.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A civil aviation communication system, comprising:

a satellite subsystem including a constellation of satellites;

a plurality of networked satellite ground stations at a plurality of designated locations in communication with the constellation of satellites; and an airborne subsystem in each of a plurality of aircraft in communication with the satellite subsystem, the airborne subsystem transmitting to the satellite subsystem in a first frequency band, the airborne subsystem receiving from the satellite subsystem in a second frequency band, the airborne subsystem communicating with a ground based subsystem in a third frequency band, between the first frequency band and the second frequency band, wherein the first frequency band, the second frequency band and the third frequency band is divided into approximately 960 channels and the first frequency band is near 1008 MHz to 1032 MHz.

2. The system of claim 1, wherein the airborne subsystem is capable of communicating voice and data with the satellite subsystem and the ground based system.

3. The system of claim 1, wherein the airborne subsystem, the satellite subsystem and the ground based system include an 8-phase DPSK (Differential Phase Shift Keying) modulator.

4. The system of claim 1, wherein the first frequency band is near 1008 MHz to 1032 MHz.

5. The system of claim 4, wherein the first frequency band, the second frequency band and the third frequency band is divided into approximately 960 channels.

6. The system of claim 5, wherein each of the channels has a bandwidth of about 25 KHz.

7. The system of claim 1, wherein each of the satellites in the constellation have a broadband transmitter which includes all the satellite to aircraft channels.

8. The system of claim 1, wherein the satellite subsystem has a first antenna to receive transmissions from the airborne subsystem.

9. The system of claim 1, wherein the satellite subsystem has a second antenna to transmit to the airborne subsystem.

10. The system of claim 1, wherein the satellite subsystem acts as a repeater between the airborne subsystem and the satellite ground stations.

11. A civil aviation communication system, comprising:

a plurality of satellites, each of the plurality of satellites having a satellite communication subsystem containing a broadband receiver;

a plurality of networked satellite ground stations, each of the plurality of networked satellite ground stations having a ground communication subsystem capable of communicating voice and data with the satellite communication subsystem;

an aircraft having an aircraft communication system capable of communicating a voice or data signal to the plurality of satellites, the aircraft communication system having a DPSK modulator, the aircraft communication system transmitting to the satellite communication subsystem in a first frequency band, the aircraft communication system receiving from the satellite communication subsystem in a second frequency band, the aircraft communication system communicating with the ground communication subsystem in a third frequency band, between the first frequency band and the second frequency band, wherein the first frequency band, the second frequency band and the third frequency band is divided into approximately 960 channels and the first frequency band is near 1008 MHz to 1032 MHz.

12. The civil aviation communication system of claim 11, wherein the satellite communication subsystem repeats an aircraft communication to one of the plurality of networked satellite ground stations.

13. The civil aviation communication system of claim 12, wherein an satellite to aircraft communication band is near 960 MHz to 984 MHz.

14. The civil aviation communication system of claim 11, wherein the aircraft communication system communicates with both the ground based system and the satellite subsystem.

15. The civil aviation communication system of claim 14, wherein a communication between the aircraft communication system and a ground based system is over a simplex channel.

16. A civil aviation communication system, comprising:
a satellite subsystem having a plurality of satellites and a plurality of satellite ground stations;
an airborne subsystem capable of communicating with the satellite subsystem;
a ground based system capable of communicating with the airborne subsystem; and
wherein the airborne subsystem transmits to the satellite subsystem in a first frequency band, the airborne subsystem receiving from the satellite subsystem in a second frequency band, the airborne subsystem communicating with a ground based system in a third frequency band, between the first frequency band and the second frequency band, wherein the first frequency band, the second frequency band and the third frequency band is divided into approximately 960 channels and the first frequency band is near 1008 MHz to 1032 MHz.

* * * * *